US009543793B2

(12) United States Patent
Chen et al.

(10) Patent No.: US 9,543,793 B2
(45) Date of Patent: Jan. 10, 2017

(54) RADIAL-WINDING STATOR OF A MOTOR

(71) Applicant: Sunonwealth Electric Machine Industry Co., Ltd., Kaohsiung (TW)

(72) Inventors: Yeh-Feng Chen, Kaohsiung (TW); Chien-Chang Huang, Kaohsiung (TW); Wen-Te Chang Chien, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 261 days.

(21) Appl. No.: 14/547,200

(22) Filed: Nov. 19, 2014

(65) Prior Publication Data

US 2015/0194854 A1 Jul. 9, 2015

(30) Foreign Application Priority Data

Jan. 8, 2014 (TW) .............................. 103100683 A

(51) Int. Cl.
*H02K 1/14* (2006.01)

(52) U.S. Cl.
CPC ........... *H02K 1/146* (2013.01); *H02K 2213/03* (2013.01)

(58) Field of Classification Search
CPC ............................ H02K 1/146; H02K 2213/03
See application file for complete search history.

(56) References Cited

U.S. PATENT DOCUMENTS

| 6,127,760 A * | 10/2000 | Nagasaki | ............... | H02K 1/146 310/194 |
| 6,194,806 B1 * | 2/2001 | Suzuki | .................... | H02K 1/148 310/194 |
| 6,963,149 B2 | 11/2005 | Chang et al. | | |
| 7,626,302 B2 * | 12/2009 | Gu | ........................... | H02K 1/02 310/216.067 |
| 8,259,408 B2 | 9/2012 | Tamaoka et al. | | |
| 8,508,882 B1 | 8/2013 | Tamaoka et al. | | |
| 2004/0232797 A1 * | 11/2004 | Chang | ..................... | H02K 1/146 310/67 R |
| 2013/0201811 A1 | 8/2013 | Tamaoka et al. | | |

FOREIGN PATENT DOCUMENTS

TW 404621 U 9/2000

* cited by examiner

*Primary Examiner* — Dang Le
(74) *Attorney, Agent, or Firm* — Alan D. Kamrath; Kamrath IP Lawfirm, P.A.

(57) ABSTRACT

A radial-winding stator of a motor including a core and eight poles is disclosed. Each pole has a magnetic pole and a pole piece. The magnetic pole is connected to the core and extends outwards from the core in a radial direction. The pole piece is formed at one end of the magnetic pole distant to the core. The pole piece includes a magnetic end face having an arc length along a circumferential direction of the core, as well as an axial height along an axial direction perpendicular to the radial direction. A ratio of the arc length to the axial height is between 2.05 and 10. In another embodiment, the radial-winding stator includes ten or twelve poles.

15 Claims, 4 Drawing Sheets

RADIAL-WINDING STATOR OF A MOTOR

BACKGROUND OF THE INVENTION

1. Field of the Invention

The present invention generally relates to a radial-winding stator of a motor and, more particularly, to a radial-winding stator of a motor in which said stator can be used in a single phase motor having an outer rotor.

2. Description of the Related Art

FIGS. 1 and 2 show a conventional eight-pole radial-winding stator 9 of a motor. The radial-winding stator 9 includes a main body 91 and eight magnetic pole portions 92 extending outwards from main body 91. Each magnetic pole portion 92 forms a magnetic pole 921 and a pole piece 922. An enamel copper wire can be wound around pole piece 922 to form a coil 93. The pole piece 922 includes an outer surface serving as a magnetic end face 923. The magnetic end face 923 is in the form of an arched face and has an arc length S9. The arc length S9 is determined by an angle θ9 and a radius R9. The arc length S9 is the occupied angle of pole piece 922 along the entire circumference of the stator. The radius R9 is the distance between a center of main body 91 and the outer surface of pole piece 922. A similar embodiment of the radial-winding stator 9 of the motor is disclosed in Taiwan Patent No. M240726.

When coils 93 are electrified, magnetic field can be generated at magnetic pole portions 92, leading to the generation of magnetic lines of force. However, only a part of the magnetic lines of force, which links with a permanent magnet of a rotor (not shown), contributes to the rotational torque of the motor. Specifically, only the magnetic lines of force, that are emitted by the part of coils 93 radially aligned with magnetic end faces 923, contribute to the rotational torque of the motor. The magnetic lines of force, that are emitted by another part of coils 93 radially misaligned with magnetic end faces 923 (the uppermost and lowermost parts 931 of coils 93 where the enamel copper wire bends), does not contribute to the rotational torque of the motor. In this regard, when the number of turns of coils 93 is increased in order to provide a larger magnetic force, the parts 931 of coils 93 also become larger. As a result, the parts of coils 93 that do not contribute to the rotational torque of the motor become larger, making it difficult to improve the efficiency of radial-winding stator 9.

On the other hand, the conventional stator 9 has a height limit. Specifically, magnetic end face 923 has a height "L9" along an axial direction of main body 91. The total value of the height "L9" and the heights of the parts 931 of coils 93 should be smaller than or equal to a maximal allowable height "H" of radial-winding stator 9. In this regard, when the parts 931 of coils 93 become larger, the total height of the parts 931 also becomes larger. Disadvantageously, the height "L9" of magnetic end face 923 becomes smaller, adversely reducing the quantity of the silicon steel plates. In other words, when the number of turns of coils 93 is increased in order to produce a larger magnetic field, the parts 931 of coils 93 will inevitably become larger. When the volume of the parts 931 of coils 93 is increased to a certain extent, the operational efficiency of the motor can no longer be improved by increasing the quantity of the silicon steel plates.

In light of this, in order to prevent the motor from having low operational efficiency due to an excessive number of turns of winding, the ratio of arc length S9 to height "L9" is designed to have a minimum value of 0.5 and a maximum value of 2. This achieves a balance between the operational power and efficiency. However, as more and more electronic products and delicate instruments are equipped with motors, there has been an increasing demand for miniaturized and compact motors. In this regard, height "L9" will be too large if the ratio of arc length S9 to height "L9" is between 0.5 and 2. Disadvantageously, the produced motors cannot be used in miniaturized motors and will not meet the market needs.

In conclusion, when the parts 931 of coils 93 become larger, the magnetic lines of force that can contribute to the rotational torque of the motor will become less and the quantity of the silicon steel plates cannot be increased, leading to a limited operational efficiency of the motor. Furthermore, since the conventional radial-winding stator 9 requires the ratio of arc length S9 to height "L9" to be between 0.5 and 2 in order to achieve a balance between the operational power and efficiency, the radial-winding stator 9 cannot be used in a miniaturized motor. Thus, it is necessary to improve the conventional radial-winding stator 9.

SUMMARY OF THE INVENTION

It is therefore the objective of this disclosure to provide a radial-winding stator of a motor having a core and a plurality of poles. Each pole has a face being a magnetic end face distant to the core. The axial height of the motor is reduced by limiting a ratio of an arc length to an axial height of the magnetic end face between 2.05 and 10. Thus, miniaturization and weight reduction of the motor can be achieved, and the utility of the radial-winding stator can be improved.

It is another objective of this disclosure to provide a radial-winding stator of a motor that reduces an arc length of the magnetic end face by increasing the number of the poles. Thus, the thickness of the magnetic pole is reduced, which allows a larger number of turns of coil to be wound around the magnetic pole. In this regard, the part of the coil that contributes to the rotational torque of the motor will become larger, improving the operational efficiency of the motor of the radial-winding stator.

In an embodiment, a radial-winding stator of a motor comprises a core and eight poles. Each pole has a magnetic pole and a pole piece. The magnetic pole is connected to the core and extends outwards from the core in a radial direction. The pole piece is formed at one end of the magnetic pole distant to the core. The pole piece includes a magnetic end face having an arc length along a circumferential direction of the core, as well as an axial height along an axial direction perpendicular to the radial direction. A ratio of the arc length to the axial height is between 2.05 and 10.

In a form shown, the magnetic end face is in a form of an arched face having an arc length that is determined by an angle and a radius. The angle is an occupied angle of the magnetic end face along a circumference of the core, and the radius is a distance between a center of the core and the magnetic end face.

In the form shown, the magnetic end face includes two interconnected arched faces. The magnetic end face has an arc length that is determined by an angle and a radius. The angle is a total occupied angle of the two arched faces along a circumference of the core, and the radius is a maximum distance between a center of the core and the magnetic end face.

In the form shown, the magnetic end face is in a form of a curved face gradually extending away from a center of the core in the circumferential direction. The magnetic end face has an arc length that is determined by an angle and a radius. The angle is a total occupied angle of the curved face along a circumference of the core, and the radius is a maximum distance between a center of the core and the magnetic end face. In the form shown, the core forms a shaft hole at a center thereof The shaft hole extends through top and bottom faces of the core in the axial direction, the poles are wound with a coil, and the motor is a single phase motor.

In another form shown, the radial-winding stator includes ten or twelve poles.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
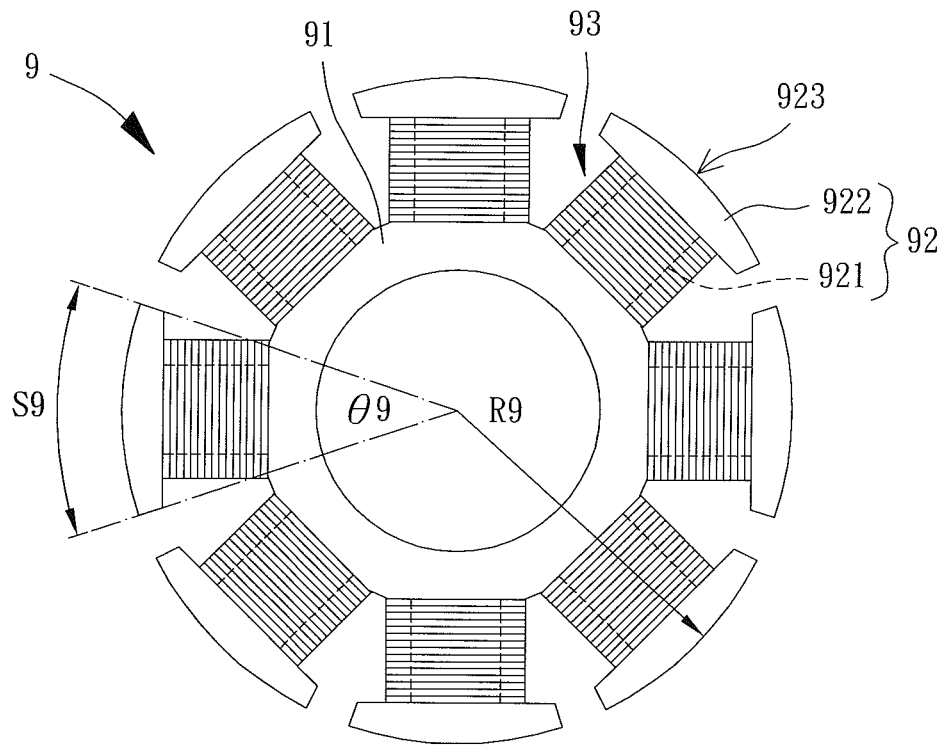
FIG. 1 shows a top view of a conventional eight-pole radial-winding stator of a motor.

In the various figures of the drawings, the same numerals designate the same or similar parts. Furthermore, when the terms "first", "second", "third", "fourth", "inner", "outer", "top", "bottom", "front", "rear" and similar terms are used hereinafter, it should be understood that these terms have reference only to the structure shown in the drawings as it would appear to a person viewing the drawings, and are utilized only to facilitate describing the invention.

DETAILED DESCRIPTION OF THE INVENTION

Figure 3:
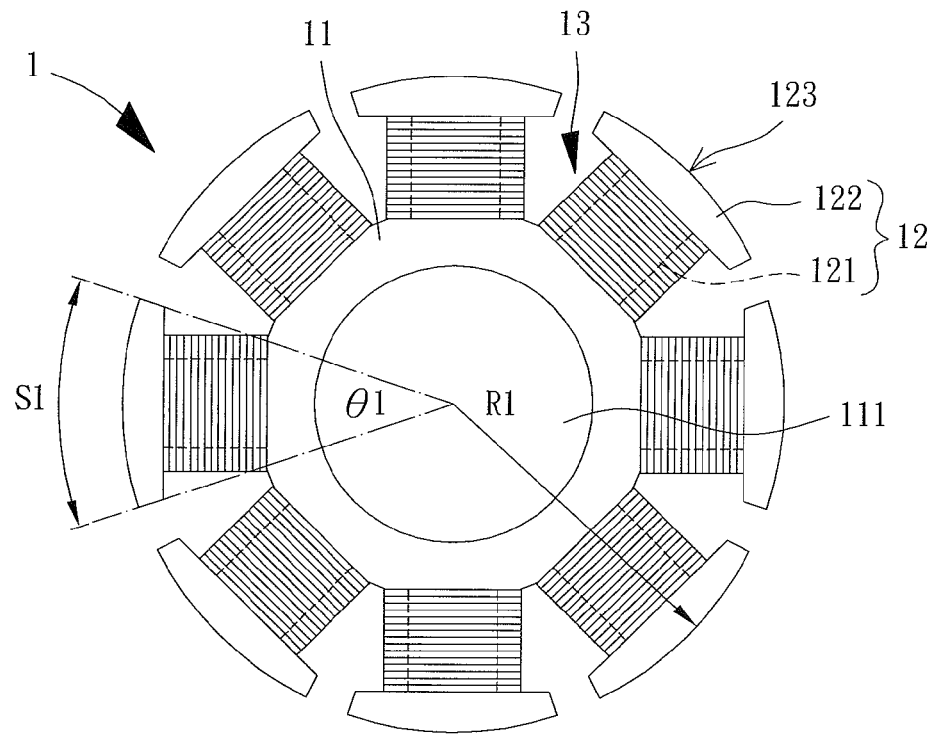
FIG. 3 shows a top view of a radial-winding stator of a motor according to a first embodiment of the disclosure.
Figure 4:
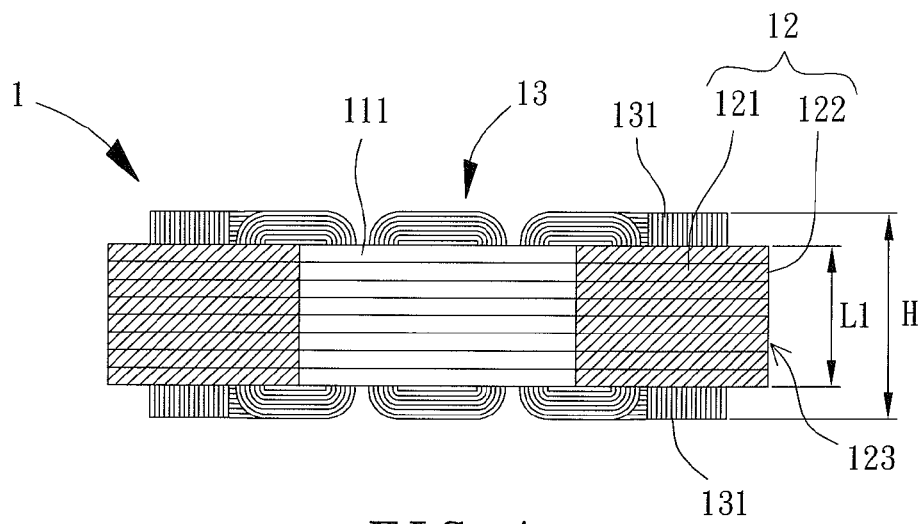
FIG. 4 shows a cross sectional view of the radial-winding stator of the motor according to the first embodiment of the disclosure.

FIGS. 3 and 4 show a radial-winding stator 1 of a motor according to a first embodiment of the disclosure. The radial-winding stator 1 may be used in a single phase motor and includes a core 11 and eight poles 12 connected to core 11. Each pole 12 is wound with a coil 13. Core 11 and eight poles 12 may be formed by stacking a plurality of silicon steel plates, but is not limited thereto.

Core 11 forms a shaft hole 111 at a center thereof The shaft hole 111 extends through the top and bottom faces of core 11 in an axial direction in order to receive a shaft (not shown). Each pole 12 includes a magnetic pole 121 that is connected to core 11 and extends outwards radially from core 11, as well as a pole piece 122 formed at one end of magnetic pole 121 distant to core 11. Coil 13 is wound around magnetic pole 121. Pole piece 122 includes a face (i.e. the face facing away from core 11) forming a magnetic end face 123.

Magnetic end face 123 is an arched face and has an arc length S1. The arc length S2 is determined by an angle θ1 and a radius R1. The arc length S1 is the occupied angle of magnetic end face 123 along the entire circumference of core 11. Radius R1 is the distance between a center of core 11 and magnetic end face 123. Since the radial-winding stator 1 has eight poles 12, the angle θ1 is smaller than 45 degrees. The arc length S1, the angle θ1 and the radius R1 can be represented by the following formula:

$$S1 = 2 * R1 * \pi * \theta 1 \div 360°.$$

Each magnetic end face 123 has a height "L1" in an axial direction of core 11. The ratio of arc length S1 to height "L1" should be between 2.05 and 10. In other words, arc length S1 should be 2.05 times larger than height "L1" at least, and 10 times larger than height "L1" at most. If the area of magnetic end face 123 is larger, the overlapped area of the induced inductances and the rotational torque of the motor is also larger. Thus, the output rotational torque of the motor is increased and the rotational torque ripple of the motor is reduced, thereby improving the rotational efficiency of the motor. Therefore, having the ratio of arc length S1 to height "L1" to be between 2.05 and 10 does ensure magnetic end face 123 to have a sufficient area, thereby improving the rotational efficiency of the motor.

Moreover, when coil 13 is wound around magnetic pole 121, coil 13 has two parts 131 respectively protruding over the upper and lower ends of magnetic end face 123 along the axial direction of core 11. The total value of the height "L1" and the heights of the parts 131 should be smaller than or equal to a maximal allowable height "H" of the radial-winding stator 1.

In comparison with the ratio of 0.5 to 2 of the conventional radial-winding stator 9, since the ratio of arc length S1 to height "L1" of the radial-winding stator 1 is between 2.05 and 10, the height "L1" of pole 12 can be smaller. Advantageously, the radial-winding stator 1 can be used in a miniaturized motor.

Figure 2:
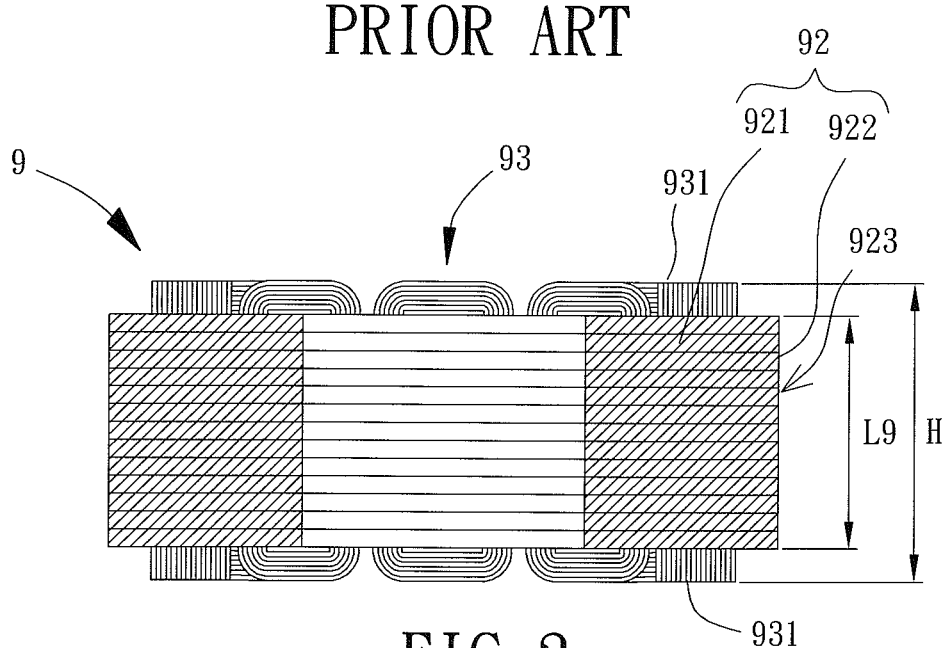
FIG. 2 shows a cross sectional view of the conventional eight-pole radial-winding stator of the motor.

Specifically, referring to FIGS. 2 and 4, if the arc length S9 of the conventional radial-winding stator 9 is the same as the arc length S1 of the conventional radial-winding stator 1, height "L1" of the radial-winding stator 1 will be smaller than height "L9" of the radial-winding stator 9. Based on this, the radial-winding stator 1 in the embodiment can have a reduced height "L1", which helps in producing a thin and compact motor. As such, the radial-winding stator 1 can be used in a motor with a limited height, improving the utility of the radial-winding stator 1.

In addition, the quantity of the silicon steel plates may become limited due to the reduced height "L1" of the radial-winding stator 1. However, magnetic pole 121 will become thinner due to the reduction in height "L1." As a result, the thinner magnetic pole 121 will allow a relatively larger number of turns of coil 13 to wind around it when compared with the conventional radial-winding stator 9. Thus, the operational efficiency of the motor can be improved.

Figure 5:
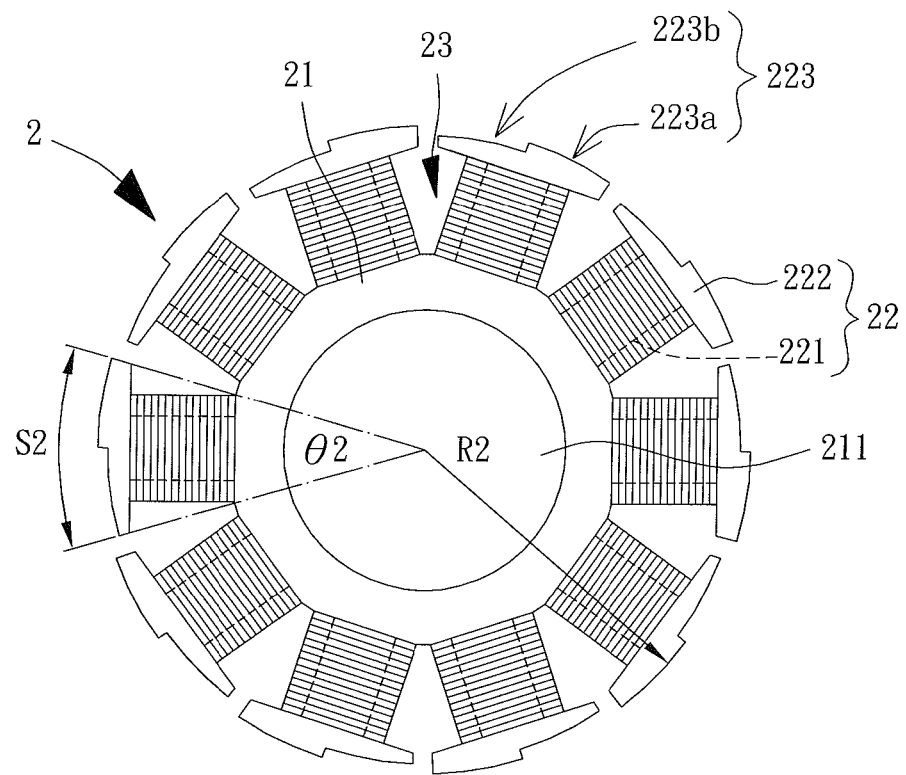
FIG. 5 shows a top view of a radial-winding stator of a motor according to a second embodiment of the disclosure.
Figure 6:
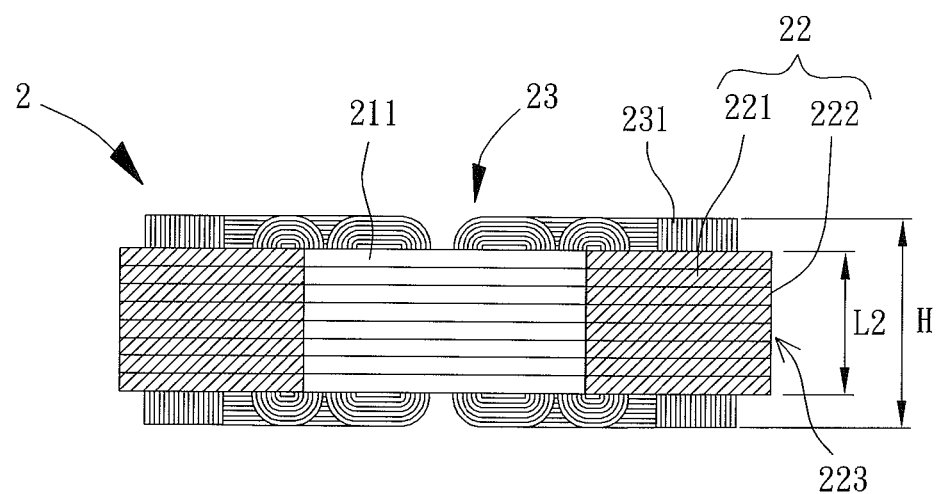
FIG. 6 shows a cross sectional view of the radial-winding stator of the motor according to the second embodiment of the disclosure.

FIGS. 5 and 6 show a radial-winding stator 2 of a motor according to a second embodiment of the disclosure. The radial-winding stator 2 may be used in a single phase motor. The second embodiment differs from the first embodiment in that the radial-winding stator 2 includes ten poles 22. Each pole 22 includes a magnetic pole 221 that is connected to core 21 and extends outwards radially from core 21, as well as a pole piece 222 formed at one end of magnetic pole 221 distant to core 21. Coil 23 is wound around magnetic pole 221. Pole piece 222 includes a face forming a magnetic end face 223.

It is noted that the magnetic end face 223 includes two arched faces 223a and 223b interconnected together. Both arched faces 223a and 223b have a radius different from each other in order to avoid the stalling of the motor during the phase transition of poles 22. Magnetic end face 223 also has an arc length S2 which is determined by an angle θ2 and a radius R2. Angle θ2 is the total occupied angle of the arched faces 223a and 223b along the entire circumference of core 21. Radius R2 is the maximum distance between a center of core 21 and magnetic end face 223.

Since the radial-winding stator 2 has ten poles 22, the angle θ2 is smaller than 36 degrees. Based on this, when radius R2 in the embodiment is the same as radius R1 in the first embodiment, the arc length S2 of magnetic end face 223 will be smaller than arc length S1 of magnetic end face 123.

In this regard, when a height "L2" of the radial-winding stator 2 in this embodiment is the same as the height "L1" in the first embodiment, the arc length S2 of magnetic end face 223 can be smaller than the arc length S1 of magnetic end face 123. The reduction of arc length S2 leads to a thinner magnetic pole 221. As a result, the thinner magnetic pole 221 will allow a relatively larger number of turns of coil 23 to wind around it when compared with the first embodiment. Therefore, the part of the coil 23 that contributes to the rotational torque of the motor will become larger, improving the operational efficiency of the motor of the radial-winding stator 2.

Figure 7:
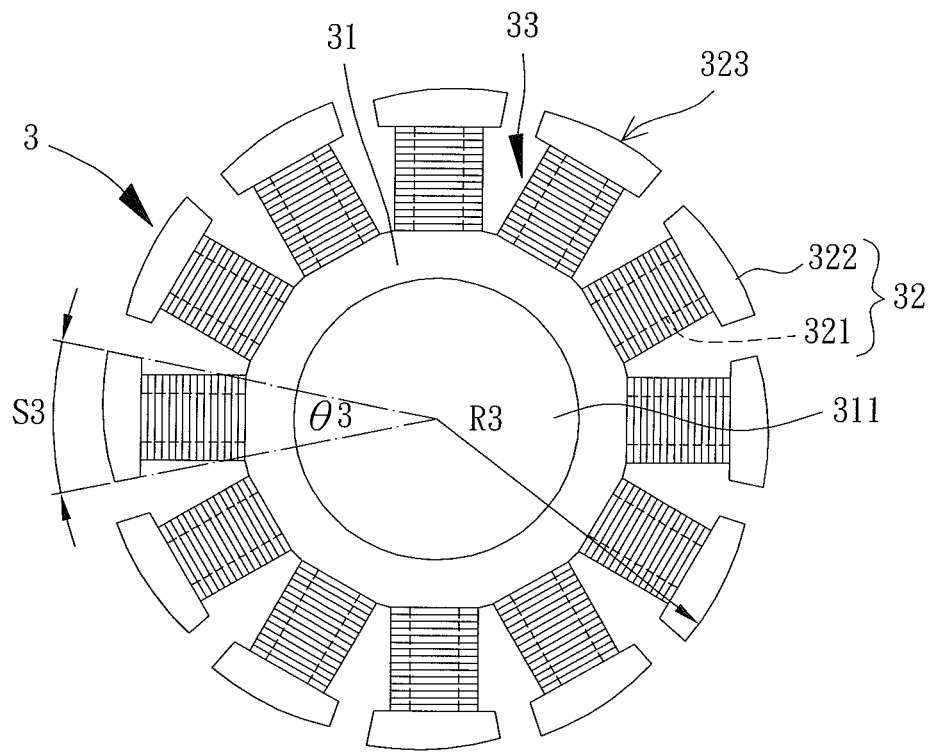
FIG. 7 shows a top view of a radial-winding stator of a motor according to a third embodiment of the disclosure.
Figure 8:
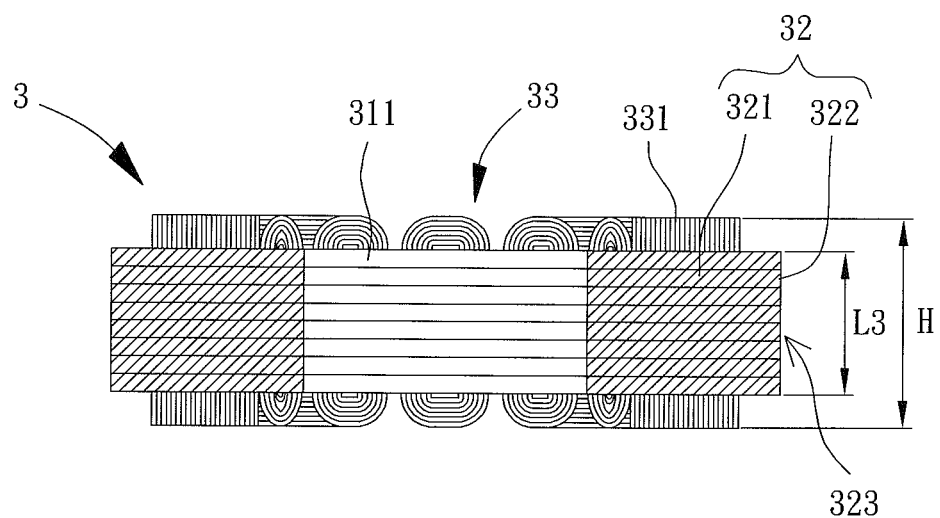
FIG. 8 shows a cross sectional view of the radial-winding stator of the motor according to the third embodiment of the disclosure.

FIGS. 7 and 8 show a radial-winding stator 3 of a motor according to a third embodiment of the disclosure. The radial-winding stator 3 may be used in a single phase motor. The third embodiment differs from the first and second embodiments in that the radial-winding stator 3 includes twelve poles 32. Each pole 32 includes. a magnetic end face 323. being in the form of a curved face gradually extending away from the center of a core 31 in a circumferential direction. Namely, magnetic end face 323 has a first side and a second side spaced from the first side in the circumferential direction, and the distance between the center of core 31 and the magnetic end face 323 gradually increases or decreases from the first side to the second side. Based on this, the stalling of the motor during the phase transition of poles 32 can be prevented. The magnetic end face 323 also has an arc length S3 that is determined by an angle θ3 and a radius R3. Angle θ3 is the occupied angle of magnetic end face 323 along the entire circumference of the stator. Radius R3 is the maximum distance between a center of core 31 and magnetic end face 323.

Since the radial-winding stator 3 has twelve poles 32, the angle 83 is smaller than 30 degrees. Based on this, when radius R3 in the embodiment is the same as radius R2 in the second embodiment, the arc length S3 of magnetic end face 323 will be smaller than or equal to arc length S2 of magnetic end face 223.

Therefore, when an axial height L3 of radial-winding stator 3 is the same as an axial height L2 of radial-winding stator 2, arc length S3 of magnetic end face 323 can be smaller than arc length S2 of magnetic end face 223, leading to a thinner magnetic pole 321. As a result, the thinner magnetic pole 321 will allow a relatively larger number of turns of coil 33 to wind around it when compared with the second embodiment. Therefore, the part of the coil 33 that contributes to the rotational torque of the motor will become larger, improving the operational efficiency of the motor of the radial-winding stator 3. As such, the radial-winding stator 3 will have best efficiency over the motors of radial-winding stators 1 and 2.

Based on the above structures, the radial-winding stators 1, 2, 3 have the following features. Specifically, as compared with the conventional eight-pole radial-winding stator 9, the axial lengths L1, L2, L3 of radial-winding stators 1, 2, 3 can be efficiently reduced by limiting the ratios of arc lengths S1, S2, S3 of magnetic end faces 123, 223, 323 to the axial lengths L1, L2, L3 in a minimum value of 2.05 and a maximum value of 10. Advantageously, the radial-winding stators 1, 2, 3 will be able to be used in miniaturized motors. Furthermore, since the magnetic poles 121, 221, 321 become thinner due to the reduction in axial lengths L1, L2, L3, the magnetic pole 121, 221, 321 can be wound with a larger number of turns of coil 13, 23, 33, improving the operational efficiency of the motors of radial-winding stators 1, 2, 3.

Moreover, the numbers of poles 22, 32 in the second and third embodiments can be increased to ten and twelve, and magnetic poles 221, 321 can have reduced thicknesses by reducing the arc lengths of magnetic end faces 223, 323. In this manner, the magnetic pole 221, 321 can be wound with a larger number of turns of coil 23, 33, improving the operational efficiency of the motors of radial-winding stators 2, 3.

In light of the above, as opposed to the conventional eight-pole radial-winding stator 9 that cannot be applied to a miniaturized motor with a limited height, the radial-winding stators of the application can have reduced axial heights and fulfill the needs of miniaturization and weight reduction. Thus, the utility of the radial-winding stators is improved.

In addition, the magnetic pole of the radial-winding stator of the application can be wound with a larger number of turns of coil by increasing the number of poles and reducing the thicknesses of the poles. Therefore, the part of the coil that contributes to the rotational torque of the motor will become larger, improving the operational efficiency of the motor of the radial-winding stator.

Although the invention has been described in detail with reference to its presently preferable embodiments, it will be understood by one of ordinary skill in the art that various modifications can be made without departing from the spirit and the scope of the invention, as set forth in the appended claims.

What is claimed is:

1. A radial-winding stator of a motor, comprising:
a core; and
eight poles each having a magnetic pole and a pole piece, wherein the magnetic pole is connected to the core and extends outwards from the core in a radial direction, wherein the pole piece is formed at one end of the magnetic pole distant to the core, wherein the pole piece includes a magnetic end face having an arc length along a circumferential direction of the core, as well as an axial height along an axial direction perpendicular to the radial direction, and wherein a ratio of the arc length to the axial height is between 2.05 and 10.

2. The radial-winding stator of the motor as claimed in claim 1, wherein the magnetic end face is in a form of an arched face having an arc length that is determined by an angle and a radius, wherein the angle is an occupied angle of the magnetic end face along a circumference of the core, and wherein the radius is a distance between a center of the core and the magnetic end face.

3. The radial-winding stator of the motor as claimed in claim 1, wherein the magnetic end face includes two interconnected arched faces, wherein the magnetic end face has an arc length that is determined by an angle and a radius, wherein the angle is a total occupied angle of the two arched faces along a circumference of the core, and wherein the radius is a maximum distance between a center of the core and the magnetic end face.

4. The radial-winding stator of the motor as claimed in claim 1, wherein the magnetic end face is in a form of a curved face gradually extending away from a center of the core in the circumferential direction, wherein the magnetic end face has an arc length that is determined by an angle and a radius, wherein the angle is a total occupied angle of the curved face along a circumference of the core, and wherein the radius is a maximum distance between a center of the core and the magnetic end face.

5. The radial-winding stator of the motor as claimed in claim 1, wherein the core forms a shaft hole at a center thereof, wherein the shaft hole extends through top and bottom faces of the core in the axial direction, wherein the poles are wound with a coil, and wherein the motor is a single phase motor.

6. A radial-winding stator of a motor, comprising:
a core; and
ten poles each having a magnetic pole and a pole piece, wherein the magnetic pole is connected to the core and extends outwards from the core in a radial direction, wherein the pole piece is formed at one end of the magnetic pole distant to the core, wherein the pole piece includes a magnetic end face having an arc length along a circumferential direction of the core, as well as an axial height along an axial direction perpendicular to the radial direction, and wherein a ratio of the arc length to the axial height is between 2.05 and 10.

7. The radial-winding stator of the motor as claimed in claim 6, wherein the magnetic end face is in a form of an arched face having an arc length that is determined by an angle and a radius, wherein the angle is an occupied angle of the magnetic end face along a circumference of the core, and wherein the radius is a distance between a center of the core and the magnetic end face.

8. The radial-winding stator of the motor as claimed in claim 6, wherein the magnetic end face includes two interconnected arched faces, wherein the magnetic end face has an arc length that is determined by an angle and a radius, wherein the angle is a total occupied angle of the two arched faces along a circumference of the core, and wherein the radius is a maximum distance between a center of the core and the magnetic end face.

9. The radial-winding stator of the motor as claimed in claim 6, wherein. the magnetic end face is in a form of a curved face gradually extending away from a center of the core in the circumferential direction, wherein the magnetic end face has an arc length that is determined by an angle and a radius, wherein the angle is a total occupied angle of the curved face along a circumference of the core, and wherein the radius is a maximum distance between a center of the core and the magnetic end face.

10. The radial-winding stator of the motor as claimed in claim 6, wherein the core forms a shaft hole at a center thereof, wherein the shaft hole extends through top and bottom faces of the core in the axial direction, wherein the poles are wound with a coil, and wherein the motor is a single phase motor.

11. A radial-winding stator of a motor, comprising:
a core; and
twelve poles each having a magnetic pole and a pole piece, wherein the magnetic pole is connected to the core and extends outwards from the core in a radial direction, wherein the pole piece is formed at one end of the magnetic pole distant to the core, wherein the pole piece includes a magnetic end face having an arc length along a circumferential direction of the core, as well as an axial height along an axial direction perpendicular to the radial direction, and wherein a ratio of the arc length to the axial height is between 2.05 and 10.

12. The radial-winding stator of the motor as claimed in claim 11, wherein the magnetic end face is in a form of an arched face having an arc length that is determined by an angle and a radius, wherein the angle is an occupied angle of the magnetic end face along a circumference of the core, and wherein the radius is a distance between a center of the core and the magnetic end face.

13. The radial-winding stator of the motor as claimed in claim 11, wherein the magnetic end face includes two interconnected arched faces, wherein the magnetic end face has an arc length that is determined by an angle and a radius, wherein the angle is a total occupied angle of the two arched faces along a circumference of the core, and wherein the radius is a maximum distance between a center of the core and the magnetic end face.

14. The radial-winding stator of the motor as claimed in claim 11, wherein the magnetic end face is in a form of a curved face gradually extending away from a center of the core in the circumferential direction, wherein the magnetic end face has an arc length that is determined by an angle and a radius, wherein the angle is a total occupied angle of the curved face along a circumference of the core, and wherein the radius is a maximum distance between a center of the core and the magnetic end face.

15. The radial-winding stator of the motor as claimed in claim 11, wherein the core forms a shaft hole at a center thereof, wherein the shaft hole extends through top and bottom faces of the core in the axial direction, wherein the poles are wound with a coil, and wherein the motor is a single phase motor.

* * * * *